United States Patent [19]

Ohara

[11] 4,396,985

[45] Aug. 2, 1983

[54] ELECTRONIC CASH REGISTER SYSTEM FOR FOOD DISPENSING BUSINESS

[75] Inventor: Hideo Ohara, Kyoto, Japan

[73] Assignee: Omron Tateisi Electronics Co., Kyoto, Japan

[21] Appl. No.: 223,765

[22] Filed: Jan. 9, 1981

[30] Foreign Application Priority Data

Jan. 16, 1980 [JP] Japan .................................. 55-4005

[51] Int. Cl.³ ...................... G06F 15/02; G06F 15/20
[52] U.S. Cl. .................................... 364/405; 364/900
[58] Field of Search ............... 364/405, 404, 709, 900

[56] References Cited

U.S. PATENT DOCUMENTS

| | | | |
|---|---|---|---|
| 4,090,247 | 5/1978 | Martin | 364/900 |
| 4,115,870 | 9/1978 | Lowell | 364/900 |
| 4,213,179 | 7/1980 | Hamano et al. | 364/405 |
| 4,317,172 | 2/1982 | Nakano | 364/405 |
| 4,319,326 | 3/1982 | Uchida | 364/405 |

FOREIGN PATENT DOCUMENTS 55-112672  8/1980  Japan .................................. 364/405

Primary Examiner—David H. Malzahn

[57] ABSTRACT

An electronic cash register system for a food dispensing business comprises an electronic cash register main body and an order information entering unit. The entering unit is adapted to collect and store as order information the information concerning codes of the items such as foods and drinks ordered by a customer and the information identifying a customer such as a table number, a customer identifiable code or the like, when such information is manually entered by a waitress in accepting an order from the customer. The entering unit is further adapted to be detachably coupled to the electronic cash register main body so that the above described information may be transferred from the entering unit to the electronic cash register main body. The electronic cash register main body is adapted such that when the entering unit is coupled to the main body the names of the items are printed out onto an order slip based on the above described order information collected and stored in the entering unit with respect to the same customer or table.

10 Claims, 9 Drawing Figures

ELECTRONIC CASH REGISTER SYSTEM FOR FOOD DISPENSING BUSINESS

BACKGROUND OF THE INVENTION

1. Field of the Invention

The present invention relates to an electronic cash register system for a food dispensing business. More specifically, the present invention relates to an improved electronic cash register system adapted for quickly and automatically issuing an order slip when a waiter accepts an order from a customer.

2. Description of the Prior Art

Electronic cash registers have been used to register the data of commodities as purchased by a customer and to issue a receipt. Such an electronic cash register is disclosed in, for example, U.S. Pat. No. 3,946,217, issued Mar. 23, 1976 to Atsushi Tsujikawa et al. and assigned to the same assignee as the present invention. As electronic cash registers come to be widely used, such have also been used in a food dispensing business, such as in restaurants, coffee shops and so on. Conventionally, electronic cash registers have been used in a food dispensing business in the following manners. More specifically, according to one way, a waiter or waitress accepts an order of foods or drinks which a customer desires and then writes down by hand the names or abbreviations of the foods or drinks which the customer ordered into an order slip. The waiter than hands over a copy of the order slip to the customer and hands over another copy to a cook or orally informs him of the customer's order. After the ordered foods and drinks are cooked, the same are served to a customer. When the customer checks out after the meal, he brings the order slip to a cash register operator. The operator operates the electronic cash register based on the data on the order slip so that the codes of the items such as foods, drinks and so on and the prices of the items are entered and the total amount as registered is paid by the customer. According to another way of using electronic cash registers, upon acceptance of an order from a customer, a waiter writes down by hand the names of the items the customer ordered in a memorandum and thereafter the waiter operates the electronic cash register for the purpose of a registering operation and a totaling operation. A totaled amount is stored in a memory for each customer in the electronic cash register and is used for payment by the customer. An order slip is then printed out by the electronic cash register and the waiter brings one copy to a cook and another copy to the customer. Meanwhile, if a kitchen printer coupled to the electronic cash register is installed in a kitchen, it is not necessary for the waiter to bring the copy of the order slip to the kitchen.

According to the first mentioned method, however, it is necessary that the waiter writes down by hand the names of the items such as foods and drinks the customer ordered in an order slip, which requires much time in accepting an order from a customer and decreases a business efficiency of the shop and prolongs a waiting time period of the customer. On the other hand, according to the latter mentioned method, an advantage is brought about that since a registering operation is made on the occasion of acceptance of an order a kitchen printer can be coupled to the electronic cash register and hence transfer of the order to the kitchen is automated and a control of an unpaid amount of the customer becomes simple. Nevertheless, it is required that the waiter once accepts an order of the items such as foods and drinks by writing down by hand the names of the items in a memorandum and then he enters the data again into the electronic cash register, causing two tiresome manual operations and causing the electronic cash register to consume more time for a registering operation, with the result that when a number of waiters make a provisonal registering operation using fewer electronic cash registers than there are waiters, the waiting time period for the customer is prolonged and efficiency is degraded. If and when a further method is employed wherein a waiter bears the names of the ordered foods and drinks in mind and then he enters the data into an electronic cash register to eliminate a handwriting work, then an error is liable to occur.

SUMMARY OF THE INVENTION

Briefly described, an order information entering unit, preferably of a hand-held type, is separately provided from an electronic cash register. The kinds of items such as foods and drinks ordered by a customer are entered as order information into the order information entering unit and stored therein. Then the order information entering unit is coupled to the electronic cash register so that the data stored in the unit may be transferred into the electronic cash register. The electronic cash register is responsive to the order information transferred from the unit, thereby to print out an order slip describing the order information.

According to the present invention, order information of items such as foods and drinks ordered from a customer can be automatically and quickly printed on an order slip and accordingly a labor required for a food dispensing business can be saved.

In a preferred embodiment of the present invention, only the codes of items such as foods and drinks ordered by the customer may be entered as order information into the order information entering unit and therefore the order accepting process can be achieved quickly. Since an order slip is printed using a printer installed in an electronic cash register based on the order information entered from the order information entering unit, any manual work by the waiter of writing down by hand the names or abbreviations of the items such as foods or drinks ordered by a customer can be saved. Furthermore, any errors caused by writing by hand or caused by difficulty in reading the written letters on the order slip which is liable to occur in manual writing can be eliminated.

In a more preferred embodiment of the present invention, the electronic cash register can be adapted such that the names of the items such as foods and drinks ordered by a customer are printed in an order slip in a fuller name or more proper name rather than a simplified or abbreviated name and therefore such names of the items such as foods and drinks ordered by the customer can be confirmed by himself through a look at it when the order slip is handed over to him, which serves to set the customer's mind at rest.

In a further preferred embodiment of the present invention, the order information is automatically printed in an order slip for each customer and the unit prices of the items in the order information is accumulated and the accumulated amount is stored. Therefore, a registering operation can be performed with easily and quickly by simply reading out the accumulated amount for each customer stored in the memory on the occasion of the registering operation.

Accordingly, a principal object of the present invention is to provide an electronic cash register system for a food dispensing business which is capable of issuing an order slip with promptitude and simplicity.

Another object of the present invention is to provide an electronic cash register system for a food dispensing business which is capable of indicating the names of the items such as foods and drinks on an order slip in a readily legible manner.

A further object of the present invention is to provide an electronic cash register system for a food dispensing business which is capable of printing of the order information on an order slip and evaluating a total amount for each customer, whereby a registering operation can be made with promptitude by a simple manual operation.

These objects and other objects, features, aspects, and advantages of the present invention will become more apparent from the following detailed description of the present invention when taken in conjunction with the accompanying drawings.

DESCRIPTION OF THE PREFERRED EMBODIMENTS

Figure 1A:
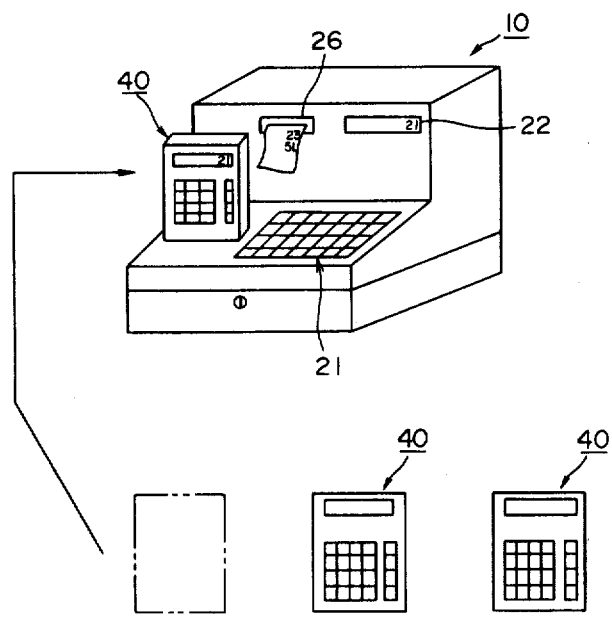
FIGS. 1A and 1B are views showing an outline of the inventive electronic cash register system for a food dispensing business.
Figure 1B:
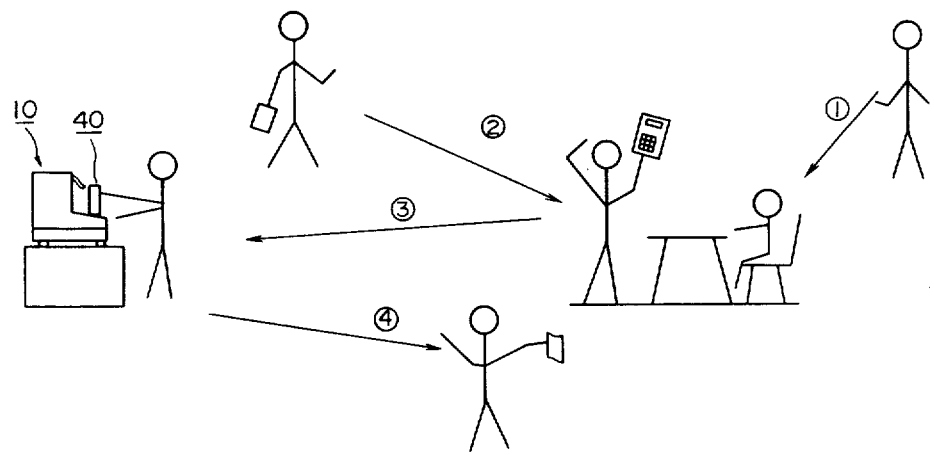

FIGS. 1A and 1B are views showing an outline of the inventive electronic cash register system for a food dispensing business. In particular, FIG. 1A is a perspective view of the inventive system and FIG. 1B is a view showing the manner of using the inventive system.

Referring to FIG. 1A, an outline of the inventive electronic cash register system for a food dispensing business will be described. The inventive electronic cash register system for a food dispensing business comprises an electronic cash register main body 10 and an order information entering unit 40 of a hand-held separately provided from the electronic cash register main body 10. The order information entering unit 40 is used as a so-called data collector and a plurality of such units 40 are preferably used in a restaurant or shop.

Referring to FIG. 1B, description will be made of an outline of a case where an order slip is prepared in accordance with the inventive system. When a customer takes a seat at a table, a waiter carrying the order infromation entering unit 40 comes to the table of the customer and asks for the order of the customer. Then the waiter enters the kinds of the items such as foods and/or drinks ordered by the customer as order information into the order information entering unit 40 so that the data may be stored therein and thereafter the waiter returns to a place where the electronic cash register main body 10 is installed and he couples the order information entering unit 40 to the electronic cash register main body 10 so that the data or the order information may be transferred from the unit 40 to the electronic cash register main body 10 and he enters a command of issuing an order slip to the main body 10. The electronic cash register main body 10 is responsive to the command to issue an order slip having the names of the items such as the foods and/or drinks of the order information printed based on the order information stored in and transferred from the order information entering unit 40. The waiter then brings the thus prepared order slip to the customer to hand out the same to the customer. The customer can confirm by looking at the order slip to see whether his order has been properly accepted.

Figure 2:
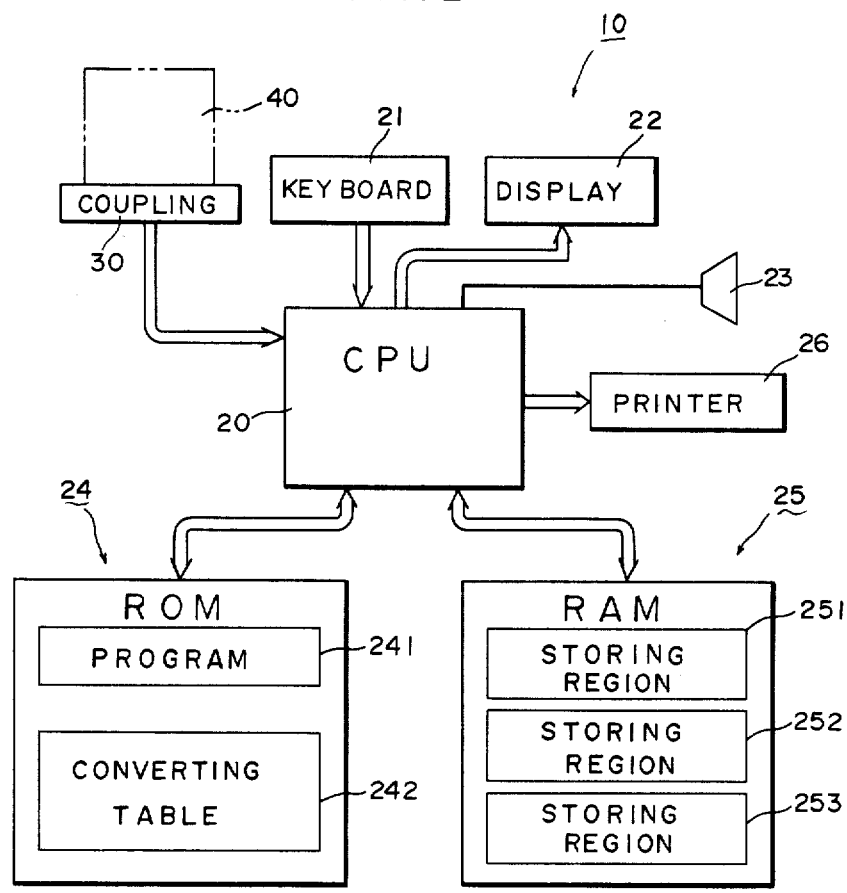
FIG. 2 is a block diagram of a major portion of the electronic cash register in accordance with one embodiment of the present invention.

Now a specific embodiment of the present invention will be described in the following. FIG. 2 is a block diagram of the electronic cash register main body 10 in accordance with one embodiment of the present invention. The electronic cash register main body 10 comprises a central processing unit or a microprocessor 20 serving as a control means, which is coupled to a keyboard 21, a display 22, a buzzer 23, a read only memory 24, a random access memory 25, a printer 26 and an input coupling portion 30.

More specifically, the keyboard 21 comprises numeral keys and a dump key and various kinds of function keys for use in a registering operation when the electronic cash register main body 10 is to operate in a conventional electronic cash register mode, as to be more fully described subsequently with reference to FIG. 3. The read only memory 24 comprises a program storing region 241 for storing an operation program of the embodiment shown as to be described subsequently with reference to FIG. 8 as well as an operation program for an operation in a conventional well-known electronic cash register mode, and an item code/item name converting information storing region or an item code/item name converting table 242 for storing coverting information and unit price information for each item name used in printing the item names and unit prices based on item codes which are allotted for the respective items such as foods and drinks. The random access memory 25 comprises a registering data storing region 251 for storing registered data or data necessary for a registering operation in the electronic cash register, a storing region 252 used as an item code work register, and a storing region 253 for storing a total amount or total amount information. The storing region 252 comprises storing areas for storing sales number data and the sales total amount for each item code allotted to each of a plurality of items such as foods and drinks. The storing region 253 comprises storing areas of identifying information for identifying a plurality of customers and comprises areas for storing a total amount corresponding to each customer identifying information storing region. The printer 26 is used to print out on an order slip the customer identifying information and the information concering the names of the items and the numbers thereof and to print out various kinds of data such as registering data in the case where the electronic cash register is used in a conventional electronic cash register mode.

Figure 3:
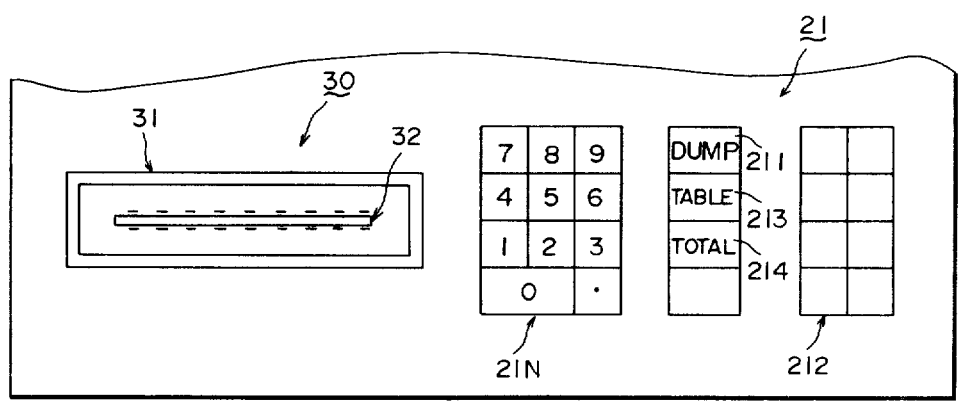
FIG. 3 is a diagrammatic view of an operation panel of the inventive electronic cash register.

FIG. 3 is a diagrammatic view of an operation panel of the electronic cash register main body 10. The operation panel of the electronic cash register main body 10 comprises the above described keyboard 21 and the input coupling portion 30 for receiving the order information entering unit 40 so that the data may be transferred from the unit 40 to the main body 10. The keyboard 21 comprises numeral keys 21 including keys allotted to the numerals 0, 1, 2, . . . 9, a dump key 211 for use as an input command means, a various kinds of function keys 212 for use in a conventional registering operation mode of the electronic cash register, a table number key 213 for use in entering the table number for identifying the customer, and a total key 214. The table number key 213 may be a customer identifying key.

The input coupling portion 30 may be structured so that the data may be transferred through electrical contact with the order information entering unit 40, through photocoupling to the order information entering unit 40, through wireless communication with the unit 40 and so on. For example, if electrical contact is employed for such data transfer from the unit 40 to the main body 10, the input coupling portion 30 comprises an inserting recess portion 31 for allowing for insertion of the order information entering unit 40, a protruding portion formed in the inserting recess portion 31 extending in the longitudinal direction, and a connector having connection terminals formed on one surface or both surfaces of the protruding portion.

Figure 4:
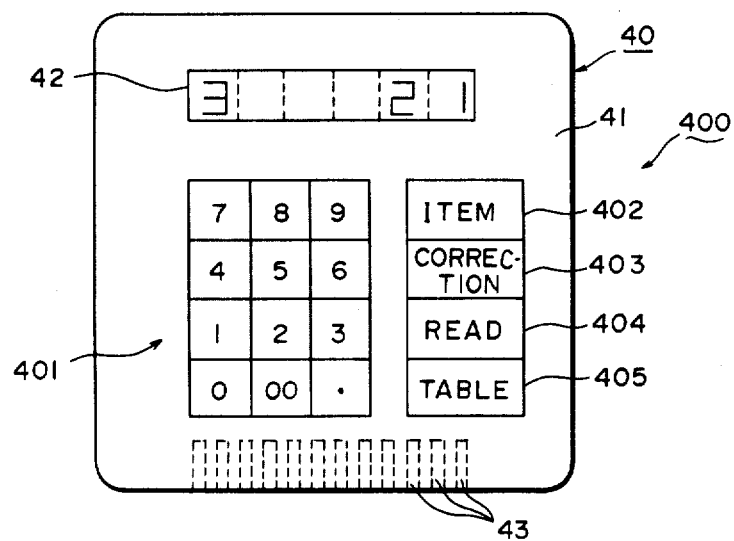
FIG. 4 is an order information entering unit feature of the present invention.

FIG. 4 illustrates one example of the order information entering unit 40. Referring to FIG. 4, the order information entering unit 40 comprises a numeral display 42 and a keyboard 400 provided on a housing 41. The keyboard 400 comprises numeral keys 401, an item code key 402 for entering the data that numerical information entered through operation of the numeral keys 401 is an item code, a correction key 403 for correcting the previously entered item code, a read key 404 for commanding a reading operation of the previously entered order information for the purpose of confirmation, and a table key 405 for use in entering a table number for the purpose of identifying a customer. The housing 41 is further formed with a fitting groove on the side surface. The fitting groove has output terminals 43 on the inner side thereof so that an output coupling portion may be formed to be in electrical contact to the previously described connector 32 when the order information entering unit 40 is fitted into the inserting recess portion 31 of the electronic cash register main body 10.

As described previously, FIGS. 3 and 4 show the input coupling portion 30 and the output coupling portion 43 of an electric contact type. However, the output terminals 43 of the electric contact type is often touched by the hands of a waiter when he manually operates the order information entering unit 40, thus is liable to cause poor electrical contact. Therefore, preferably these coupling portions 30 and 43 may be structured as a photocoupling type, as to be depicted subsequently with reference to FIG. 5.

Figure 5:
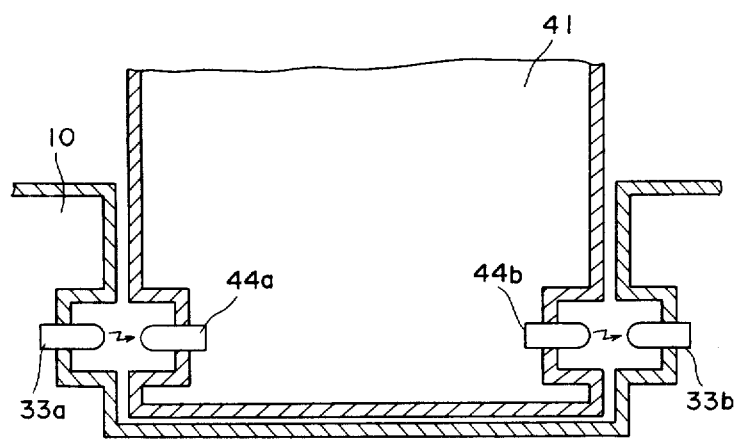
FIG. 5 is a sectional view showing an embodiment of a coupling scheme between the electronic cash register and the order information entering unit.

FIG. 5 is a sectional view showing another embodiment of a coupling scheme of the input coupling portion of the electronic cash register main body 10 and the output coupling portion of the order information entering unit 40. The order information entering unit 40 of the embodiment shown comprises a photosensing portion 44a and a light emitting portion 44b formed at the left and right sides of the lower portion of the housing 41. On the other hand, the inserting recess portion 31 of the electronic cash register main body 10 comprises a light emitting portion 33a and a photosensing portion 33b formed inside the inserting recess portion 31 of the electronic cash register main body 10 at the positions corresponding to the photosensing portion 44a and the light emitting portion 44b when the order information entering unit 40 is mounted to the electronic cash register main body 10. A combination of these light emitting portions and photosensing portions may comprise a combination of light emitting diodes and photo transistors, or photocouplers.

In the case where the order information entering unit 40 is not mounted to the inserting recess portion 31 of the electronic cash register main body 10, the photosensing light receiving portion 33b does not provide an output or, even if the same provides an output, the same receives a light beam from the light emitting portion 33a and the output therefrom is extremely small. Therefore such state can be used to detect that the order information entering unit 40 has not been mounted.

On the other hand, if and when the order information entering unit 40 is mounted into the inserting recess portion 31 of the electronic cash register main body 10, then the light emitting portion 33a emits light which serves as a data read command signal and is received by the photosensing portion 44a. As a result, the order information entering unit 40 reads the order information and the light emitting portion 44b is caused to emit light in accordance with the order information. As a result, the order information is converted into an optical signal and is transferred from the light emitting portion 44b to the photosensing portion 33b.

Meanwhile, a coupling scheme of the output coupling portion of the order information entering unit 40 and the input coupling portion of the electronic cash register main body 10 may be of any of other well-known coupling types, insofar as data can be transferred through such coupling scheme.

Figure 6:
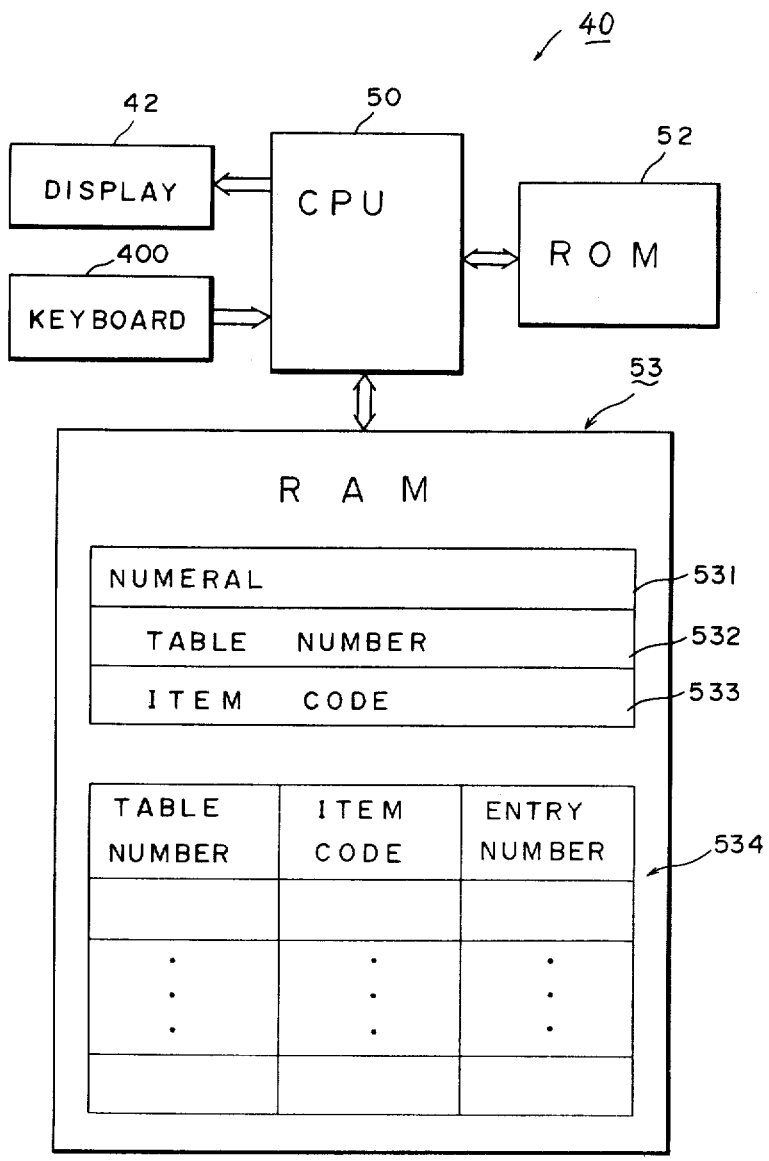
FIG. 6 is a block diagram of the order information entering unit.

FIG. 6 is a block diagram of the above described order information entering unit 40. Referring to FIG. 6, the order information entering unit 40 comprises a central porcessing unit or a microprocessor 50. The central processing unit 50 is coupled to the previously described keyboard 400, the previously described display 42, a read only memory 52 and a random access memory 53. The read only memory 52 is used to store, in advance, an operation program for entering order information as to be described subsequently with reference to FIG. 7. The random access memory 53 comprises a plurality of storing regions 531 to 534. These storing regions 531 to 534 each comprise suitable address member. The storing region 531 is used as a numeral register serving also as a display register for temporarily storing numerical value information entered through operation of the numeral keys 401 included in the keyboard 400. The storing region 532 is used as a table number register for temporarily storing the table number entered through operation of the numeral key 401 and the table keys 405. The storing region 533 is used as an item code work register for temporarily storing the item code entered through operation of the numeral keys 401 and the item code key 402. The storing region 534 comprises a plurality of addresses, each comprising a table number storing area, an item code storing area, and an entry number storing area. The storing region 534 is used as a registering information storing region for storing the number of registering operations and the table number for each item code based on the content in the item code work register 533 and the table number register 532.

Figure 7:
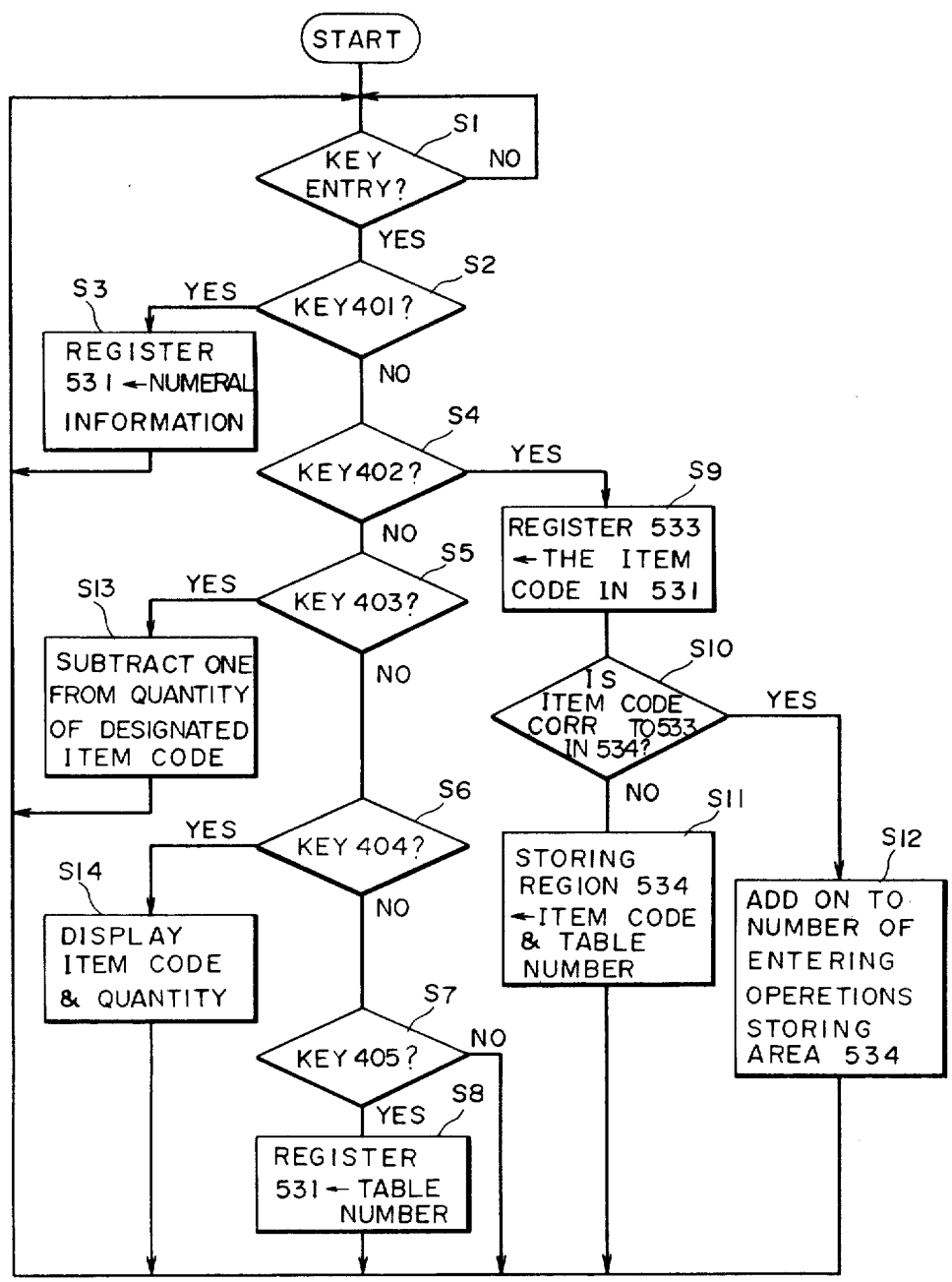
FIG. 7 is a flow diagram of the operation of the order information entering unit.

FIG. 7 is a flow diagram of the operation of the order information entering unit 40. Now referring to FIGS. 4 to 7, a description will be made of an operation in the case where the order information is entered using the order information entering unit 40. The order information entering unit 40 is manually operated in the following manner when an order is accepted from a customer. In order to identify the customer of which table from whom the order is accepted, the waiter manually operates the numeral keys 401 of the unit 40 to enter the table number and then depresses or operates the table key 405. Then the waiter operates the numeral keys 401 to enter an item code or the name of each of the items, such as foods, drinks and the like, ordered by the customer, and further depresses the item code key 402, whereby the order information of one item is entered one by one.

Meanwhile, the above described central processing unit 50 normally repeats an operation of determining whether any key is operated, thereby to be in a standby state until any key is operated. When any one of the numeral keys 401 is operated, the central processing unit 50 performs the following operation. At the step 1 the central processing unit 50 determines that any one of the keys is operated. At the step 2 the central processing unit 50 determines that the key entry is of one of the numeral keys 401, whereupon the program proceeds to the step 3. At the step 3 the central processing unit 50 stores the numeral information stored by operation of the numeral keys 401 in the numeral register 531, whereupon the program returns to the step 1.

When the table key 405 is depressed thereafter, the central processing unit 50 makes the following operation. At the step 1 the central processing unit 50 determines that any one of the keys is operated and at the step 2 the unit 50 determines that the key entry is not of the numeral keys 401 and at the step 4 the unit 50 determines that the key entry is not of an item code key 402 and at the step 5 the unit 50 determines that the key entry is not of the correction key 403 and at the step 6 the unit 50 determines that the key entry is not of the read key 404 and at the step 7 the unit 50 determines that the key entry is of the table key 405, whereupon the program proceeds to the step 8. At the step 8 the central processing unit 50 stores the table number information into the table number register 532, whereupon the program returns to the step 1.

When the item code is entered by operating the numeral keys 401, the central processing unit 50 stores the numerical information concerning the item code in the numerical register 531, as done in the previously described steps 1 to 3. When the item code key 402 is depressed, the central processing unit 50 determines at the step 1 that any one of the keys is operated and at the step 2 the unit 50 determines that the key entry just made is not of the numeral keys and at the step 4 the unit 50 determines that the key entry is of the item code key, whereupon the program proceeds to the step 9. At the step 9 the central processing unit 50 stores the content of the numeral register 531 into the item code work register 533. Then at the step 10 the central processing unit 50 determines whether the contents of the item code work register 533 coincides with the item code stored in each of the addresses of the registering information storing region 534 and whether the table number corresponding to the present item code coincides with the contents of the table number register 532. If and when an item code which has not been stored in any addresses of the registering information storing region 534 is entered, then at the step 11 the central processing unit 50 stores the above described item code and the table number at the top of the registering information storing region 534 and sets the number one therein. The purpose of storing the table number in the registering information storing region 534 is to make it possible to store many orders from two or more tables using one order information entering unit 40. Then the central processing unit 50 returns to the previously described step 1, whereupon the unit 50 repeats a key entry awaiting operation.

By repeating the above described operation, the waiter sequentially registers or enters the item codes of the items, such as foods, drinks and the like, ordered by the customer. In the case where two or more items of the same item code are ordered, it follows that the item code stored in the item code work register 533 coincides with the item code stored in the item code storing region of any other address in the registering information storing region 534. In such as case, at the step 10 the central processing unit 50 determines that the content in the item code work register 533 coincides with the item code stored in any one of the addresses in the registering information storing region 534 and the content in the table number register 532 coincides with the table number stored in the table number storing region in the address corresponding to the above described item code, whereupon the program proceeds to the step 12. At the step 12 the central processing unit 50 designates the address of the registering information storing region 534 storing the same table number and the item code based on the content in the table number register 532, i.e. the table number, and the content in the item code work register 533, i.e. the item code, whereupon one is added to the content in the registering number storing region at that address, whereupon the program returns to the above described step 1.

Meanwhile, in the case where an order is canceled after once the order is accepted from the customer of the order is erroneously entered by the waiter, it is necessary to cancel the previously entered item code and the number. Therefore, in the case where the item code previously entered is to be corrected, such correction is performed by depressing the correction key 403. More specifically, when the correction key 403 is depressed, the central processing unit 50 first performs the previously described determining operations at the steps 1, 2 and 4 and then at the step 5 the unit 50 determines that the correction key 403 is depressed, whereupon the program proceeds to the step 13. At the step 13 the central processing unit 50 designates the address of the registering information storing region 534 storing the item code and the table number based on the content in the item code work register 533 and the content in the table number register 532, thereby to read the item code and the number of entering operations, i.e. the number of registering operations. Then the central processing unit 50 makes display of the item code and the number of entering operations of that item by means of the numeral display 42, while one is subtracted from the above described number and the unit 50 stores the item code and the new corrected number in the original address of the storing region 534. Meanwhile, if and when the number becomes zero, the content in the address of the registering information storing region 534 previously read out is cleared. As a result, a correcting operation of the item code of the order already accepted is performed.

Meanwhile, if and when a number of items are to be ordered, it could become necessary to confirm the item codes and the number of items as entered. In such a case, the waiter depresses the read key 404. Upon depression of the read key 404, the central processing unit 50 first performs the operation at the previously described steps 1, 2, 4 and 5 and at the step 6 the unit 50 determines that the read key 404 is depressed, whereupon the program proceeds to the step 14. At the step 14 the central processing unit 50 reads the item codes and the numbers thereof as stored in the respective addresses of the registering information storing region 534 and displays the same in the numeral display 42.

Thereafter likewise each time the read key 404 is depressed, the central processing unit 50 sequentially reads the item codes and the numbers thereof stored in the addresses following the item codes previously displayed which are stored in the registering information storing region 534 and display the same in the numeral display 42, thereby to notify the waiter thereof. After all the items and the numbers thereof are displayed, and when the read key 404 is depressed, the central processing unit 50 displays by the numeral display 42 that the item code and the number thereof are zero, thereby to notify that all the item codes and the numbers thereof as registered are read out. In the case where any portion requiring correction is found during the reading operation, the waiter depresses the correction key 403 and accordingly the central processing unit 50 subtracts one from the number of the read out item code.

Figure 8:
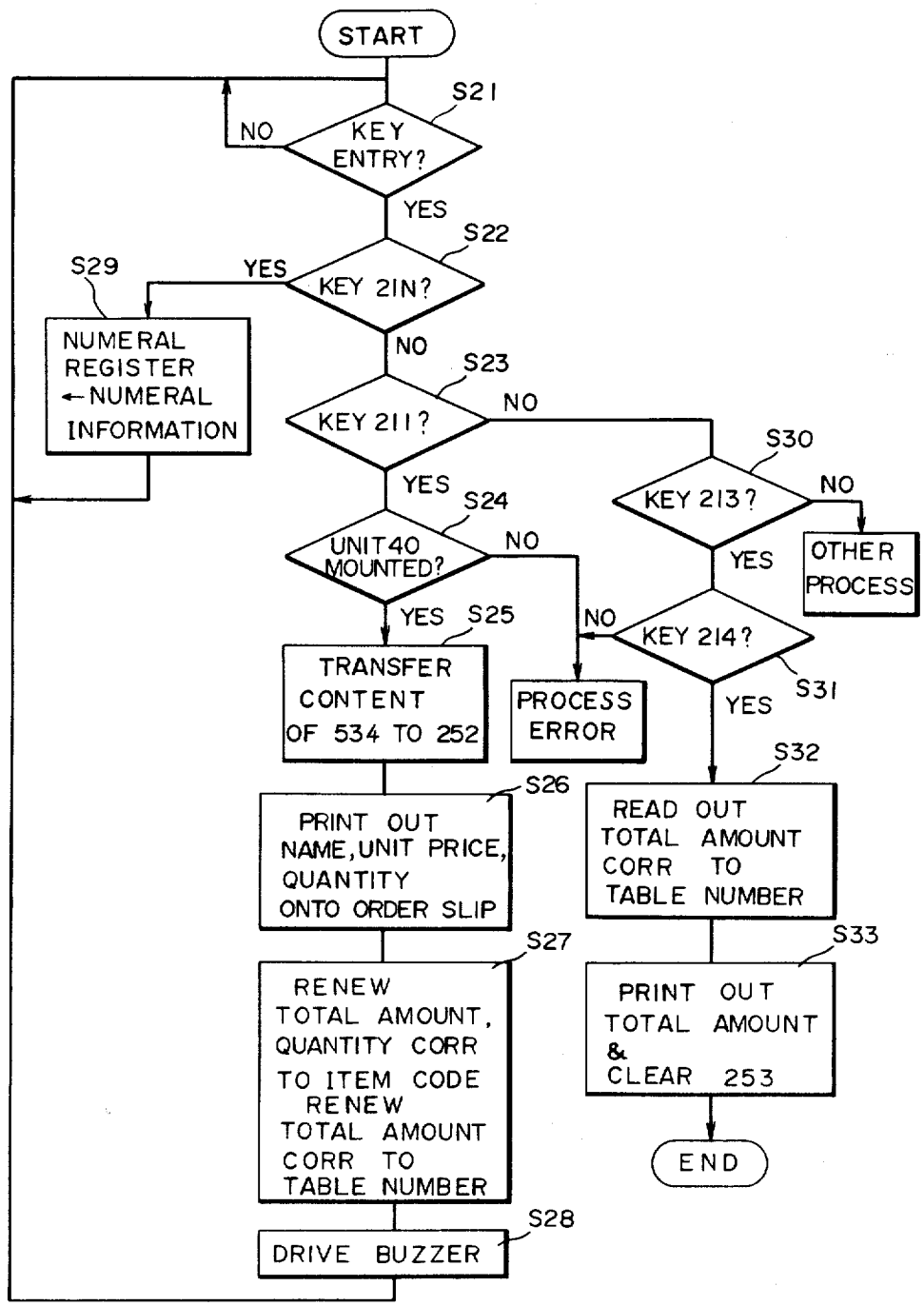
FIG. 8 is a flow diagram of the operation of the inventive electronic cash register.

FIG. 8 is a flow diagram of the operation of the electronic cash register main body 10 and in particular the operation in the case where the names of the items are printed out based on the order information entered by the order information entering unit 40 and in the case of the registering operation, which constitute the features of the present invention.

Now referring to FIGS. 2 and 3 and 8, a description will be made of an operation in the case where the names of the items ordered are printed on an order slip based on the order information entered by the order information entering unit 40. The waiter mounts the order information entering unit 40 in which the order information has already been entered into the inserting recess portion 31 of the electronic cash register main body 10, thereby to establish an electrical connection between the output terminals 43 and the connector 32, and then the waiter depresses the dump key 211.

At that time the central processing unit 20 has been repeating a determining operation at the step 21 as to whether any key is operated. Upon determining that any one of the keys is operated, the central processing unit 20 determines at the step 22 that the key entry is not of the numeral keys 21N. Then at the step 23 the central processing unit 20 determines that the dump key 211 is depressed and at the step 24 the unit 50 determines whether the order information entering unit 40 has been mounted to the inserting recess portion 31 of the electronic cash register main body 10. If and when it is determined that the unit 40 has been mounted to the main body 10, then the operation of the order slip issuing mode is performed in the manner set forth in the following.

More specifically, at the step 25 the central processing unit 20 provides a read command to the order information entering unit 40. Accordingly, the order information entering unit 40 sequentially reads in the order of addresses the contents stored in the registering information storing region 534 in the same manner as that in the operation in the case where the read key 404 is depressed. The order information read out from the registering information storing region 534 is transferred through the output terminal 43 and the connector 32 to the central processing unit 20. Accordingly, the central processing unit 20 sequentially stores in the order of the addresses of the storing region 252 of the random access memory 25 the contents read from the registering information storing region 534. Accordingly, the information concerning the table numbers and the number of entering operations of the respective items stored in the registering information storing region 534 is as such stored in the storing region 252.

Then at the step 26 the central processing unit 20 reads the information concerning the name of the item and the unit price corresponding to item code from the item code/item name converting table 242 included in the read only memory 24 based on the item code stored in the first address in the storing region 252 and provides this information to the printer 26. Accordingly, the printer 26 prints the name and the unit price, corresponding to the item code stored in the first address in the storing region 252, onto an order slip. The central processing unit 20 further reads sequentially the information concerning the name and the unit price corresponding to the item code from the item code/item name converting table 242 based on the item code stored in each of the subsequent addresses of the same table number as the table number of the first address stored in the storing region 252 and provides the said information to the printer 26, thereby to print out the names and the unit prices of the respective items of the same table number. If and when the central processing unit 20 completes a printing operation of the names and the unit prices of all the item codes of the same table number stored in the storing region 252 preparation of an order slip of the customer of the same table is completed. Then the central processing unit 20 sequentially retrieves the addresses of another table number different from the table number stored in the first address of the storing region 252 in order to issue an order slip of the customer of another table. If and when a different table number is found, the central processing unit 20 repeats substantially the same operations, thereby to issue all the slips separately for each of the different table numbers.

At the following step 27 the central processing unit 20 adds the respective numbers of items and the unit prices to the contents in the storing areas of the number of items and the total amounts for the respective item codes in the storing region 253 corresponding to the item codes stored in succession in the addresses of the storing region 252, thereby to produce and store the sales data. The central processing unit 20 also adds the unit prices of the respective item codes based on the item codes of the same table number out of the table numbers stored in the respective addresses of the storing regions 252, thereby to evaluate the total amount, i.e. the accumulated amount of the prices for the customer of the same table number. The total amount of each table number is stored in the total amount per each table number storing area of the storing region 254.

When the above described operation is completed, at the step 28 the buzzer 23 is driven to raise an alarm, thereby to notify completion of the printing operation of an order slip.

The waiter removes the order information entering unit 40 from the electronic cash register main body 10 and brings the order slip thus printed out to the table of the customer and hands over the same to the customer.

As described in the foregoing, according to the embodiment shown, the item codes of the items such as foods, drinks and the like ordered by a customer are entered using the order information entering unit 40 and the names of the items thus ordered can be printed out on an order slip by simply mounting the order information entering unit 40 onto the electronic cash register main body 10 and as a result an order slip can be printed and issued with promptitude and ease in a readily legible manner.

Meanwhile, the inventive electronic cash register system for a food dispensing business can be used not only for issuing an order slip in the above described manner but also for making a registering operation based on the total amount information for each table number used in issuing an order slip. Therefore, in the following an operation of such registering operation will be described.

In the case of checking out after the meal of the items ordered in the above described manner, the customer comes to the place where the electronic cash register main body 10 is installed and he hands over the order slip to the operator so that a registering operation is performed. In such a case, the operator first operates the numeral keys 21N, thereby to enter the table number printed on the order slip. Accordingly, at the step 21 the central processing unit 20 determines whether any of the keys is operated and at the step 22 the unit 20 determines that the key entry is of the numeral keys 21N, whereupon the program proceeds to the step 29. At the step 29 the central processing unit 20 stores the numeral information as entered by operation of the numeral keys 21N in the predetermined address included in the storing region 251 (the numeral register) and then the program returns to the step 21.

Thereafter the operator sequentially depresses the table key 213 and the total key 214. Accordingly, the central processing unit 20 repeats the operation at the previously described steps 21 to 23 and at the step 23 the central processing unit 20 determines that the key entry is not of the dump key 211 and the program proceeds to the step 30 to perform the operation of the mode other than the order slip issuing mode. More specifically, the central processing unit 20 selects the operation mode based upon the determination at the step 23 as to whether the key entry is of the dump key 211. The central processing unit 20 determines at the step 30 that the table key 213 is depressed and at the step 31 the unit 20 determines that the total key 214 is depressed, whereupon the operation at the step 32 is performed. More specifically, at the step 32 the central processing unit reads the total amount corresponding to the table number stored in the numeral register out of the total amounts of the respective table numbers stored in the storing region 253. Then at the step 33 the central processing unit 20 prints the registered amounts corresponding to the table number into the total amount printing region of the order slip or a separate receipt, whereupon the table number and the total amount corresponding to the present table number in the storing regions 253 are cleared and a series of operations is completed. As a result, the total amount of all the items ordered by the customer of the same table number used in issuing the order slip can be automatically evaluated and an advantage is brought about that a registering operation can be made with promptitude when the customer checks out.

Meanwhile, in the case where it is determined at the previously described step 24 that the order information entering unit 40 has not been mounted onto the electronic cash register main body 10 or in the case where it is determined at the step 31 that the registering mode key 214 has not been depressed, an error processing is performed. In the case where any key other than the table key 213 is operated after the numeral keys 21N are operated, the mode is switched to a normal operation mode, whereupon any other registering operation is performed in the same manner as that in a conventional well-known electronic cash register. Such a conventional registering operation in a conventional electronic cash register is fully described in the previously referenced U.S. Pat. No. 3,946,217 and is incorporated herein by reference thereto.

Meanwhile, although in the above described embodiment the table number was utilized to identify a customer when the order information of different customers is entered in the order information entering unit 40, any other types of information identifying the customers, such as a customer identifying code and the like may be used. On the assumption that the order information entering unit 40 is used only to enter an order of a single customer, it would be unnecessary to employ a table or customer identifying information such as a table number or a customer identifying code.

It is pointed out that the present invention can be applied not only to a case where only one electronic cash register main body 10 is employed but also to a case where a plurality of electronic cash register main bodies 10 are utilized. In the latter mentioned case, a unit identifying code is allotted to each of the order information entering units 40 and, when one of the order information entering units 40 is mounted to one of the electronic cash register main bodies to issue an order slip the electronic cash register identifying information is also preferably recorded. On the occasion of checking out, a registering operation for a checking out operation is preferably performed by the electronic cash register main body which issued the order slip.

The fundamental principle of the present invention could be further developed not only to an environment wherein an order information entering unit is detachably mounted to an electronic cash register main body but also to a further different application environment as described in the following. For example, another advantageous application would be such that an electronic cash register main body is installed at a place spaced apart from the tables and a terminal unit including an order information entering unit and a printer is provided at each table or in the vicinity of each table and the electronic cash register main body is coupled to each of the terminal units installed associated with the respective tables through the respective data busses. In such a case, when the item codes entered through operation of the order information entering unit are transferred to the electronic cash register, the electronic cash register returns the information concerning the names and the unit prices of the items to the order information entering unit based on the item codes, whereby the printer is controlled to print out an order slip at each table.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic cash register system for a food dispensing business, comprising: an electronic cash register main body, and an order information entering unit, provided separately from said electronic cash register main body, for accepting and providing order information for ordered items having respective prices, said order information entering unit including order information entry means for entering said order information into said order information entering unit, storage means for storing said order information entered by said order information entry means, and output coupling means for coupling said order information entering unit to said electronic cash register main body, and for outputting said order information stored in said storage means; and said electronic cash register main body including input coupling means for coupling said electronic cash register main body to said order information entering unit, and for receiving said order information from said output coupling means of said order information entering unit, manual input command means for receiving manual inputs and initiating the transfer of said order information from said order information entering unit to said electronic cash register main body in response to at least one of said manual inputs, printing means responsive to said order information for printing out said order information determining means, responsive to said manual input command means, for determining whether said output coupling means is coupled to said input coupling means, and for providing a detection signal indicating said output coupling means being coupled to said input coupling means, and control means, responsive to said detection signal, for reading said order information stored in said storage means, and for providing said order information read from said storage means to said printing means for printing said order information.

2. An electronic cash register system for a food dispensing business in accordance with claim 1, wherein each of said ordered items has an identifying code and an associated name, wherein said order information entering means comprises item code information entry means for entering said identifying code, and wherein said control means comprises item printing control means for controlling said printing means, for printing said identifying code and said associated name.

3. An electronic cash register system for a food dispensing business in accordance with claim 1, wherein said order information includes customer identification information, and said order information entry means comprises:

customer identification information entry means, for entering said customer identification information, and said storage means comprises storing regions for storing said customer identification information.

4. An electronic cash register system for a food dispensing business in accordance with claim 3, wherein said control means comprises customer print control means, responsive to said customer identification information, for controlling said printing means, and for printing said order information in accordance with said customer identification information.

5. An electronic cash register system for a food dispensing business in accordance with claim 3, wherein said electronic cash register main body has a registering operation, an order slip issuing mode and another operation mode, and further comprises operation mode selecting means for selecting one of said order slip issuing mode and said another operation mode in response to said coupling between said output coupling means of said order information entering unit and said input coupling means of said electronic cash register main body and to at least one of said manual inputs of said manual input command means, and said control means being further responsive to said selecting of said order slip issuing mode and controlling said printing means in response to said selecting of said order slip issuing mode, and responsive to said selecting of said another operation mode and controlling said electronic cash register main body registering operation in response to said selecting of said another operation mode.

6. An electronic cash register system for a food dispensing business in accordance with claim 5, wherein said electronic cash register main body further comprises:

price storage means for storing the respective prices of said ordered items; and accumulated amount storage means, having storing regions and being responsive to said customer identification information, for accumulatively storing the respective prices of the ordered items in accordance with said customer identification information, and wherein said control means controls the reading out of said price storage means the respective prices of said ordered items, controls the printing of said prices, and controls the accumulation of said prices and the storing of said accumulation in said storing regions of said accumulative amount storage means in response to the selecting of said order slip issuing mode by said operation mode selecting means in accordance with said customer identification information.

7. An electronic cash register system for a food dispensing business in accordance with claim 6, wherein said electronic cash register main body further comprises:

registering operation command means for initiating said registering operation, and means for entering said customer identification information, and wherein said control means controls the reading out of said accumulative amount from said accumulative storage means in accordance with said customer identification information, and controls said registering operation.

8. An electronic cash register system for a food dispensing business, said system comprising: an electronic cash register main body, and an order information entry unit for accepting and providing order information including customer identification information, for ordered items, each item having a respective price, said unit including order information entry means for entering said order information into said order information entering unit;

storage means, having storing regions, for storing said order information; and output coupling means for coupling said order information entering unit to said electronic cash register main body, and for providing, as an output, said order information stored in said storage means; and, said electronic cash register main body having a registering operation, an order slip issuing mode, and another operation mode, including input coupling means for coupling said electronic cash register main body to said order information entering unit, and for receiving said order information from said output coupling means;

manual input command means for receiving manual inputs and initiating the transfer of said order information from said order information entering unit to said electronic cash register main body in response to at least one of said manual inputs;

determining means, responsive to said manual input command means, for determining whether said output coupling means is coupled to said input coupling means, and for providing a detection signal indicating said output coupling means being coupled to said input coupling means;

operation mode selecting means for selecting one of said order slip issuing mode and said another operation mode in response to said detection signal and to at least one of said manual inputs;

printing means responsive to said order information for printing out said order information; and control means responsive to said detection signal, for reading said order information stored in said storage means, for providing said order information read from said storage means to said printing means, for controlling said printing means in response to said cash register main body being in said order slip issuing mode, and for controlling said registering operation in response to said cash register main body being in said another operation mode.

9. An electronic cash register system for a food dispensing business in accordance with claim 1, 2, 3, 4, 5, 6, 7, or 8, wherein said output coupling means of said order information entering unit and said input coupling means of said electronic cash register main body each comprise electrical connection means for establishing an electrical connection therebetween for allowing for data transmission between said order information unit and said electronic cash register main body.

10. An electronic cash register system for a food dispensing business in accordance with claim 1, 2, 3, 4, 5, 6, 7, or 8, wherein said output coupling means of said order information entering unit and said input coupling means of said electronic cash register main body comprise optical coupling means for transmitting data between said order information unit and said electronic cash register main body.

* * * * *